US012627557B2

(12) United States Patent
Jain et al.

(10) Patent No.: US 12,627,557 B2
(45) Date of Patent: \*May 12, 2026

(54) PHYSICAL NETWORK ORCHESTRATION FOR DATA CENTERS

(71) Applicant: Cisco Technology, Inc., San Jose, CA (US)

(72) Inventors: Vipin Jain, San Jose, CA (US); Suran Saminda de Silva, Saratoga, CA (US); Shyam Kapadia, Santa Clara, CA (US); Nilesh Shah, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 17/817,199

(22) Filed: Aug. 3, 2022

(65) Prior Publication Data

US 2022/0376973 A1      Nov. 24, 2022

Related U.S. Application Data

(63) Continuation of application No. 17/349,016, filed on Jun. 16, 2021, which is a continuation of application No. 16/696,729, filed on Nov. 26, 2019, now Pat. No. 11,057,270, which is a continuation of application No. 15/842,411, filed on Dec. 14, 2017, now Pat. No. 10,523,504, which is a continuation of application No. 13/921,083, filed on Jun. 18, 2013, now Pat. No. 9,860,116.

(51) Int. Cl.
*H04L 41/0806*      (2022.01)
*H04L 41/084*      (2022.01)

*H04L 45/586*      (2022.01)
*H04L 49/15*      (2022.01)

(52) U.S. Cl.
CPC ........ *H04L 41/0806* (2013.01); *H04L 41/084* (2013.01); *H04L 49/1569* (2013.01); *H04J 2203/0014* (2013.01); *H04L 45/586* (2013.01)

(58) Field of Classification Search
CPC .............. H04L 41/0806; H04L 41/084; H04L 49/1569; H04L 45/586; H04J 2203/0014
See application file for complete search history.

(56) References Cited

U.S. PATENT DOCUMENTS

| | | | |
|---|---|---|---|
| 5,924,094 A | 7/1999 | Sutter | |
| 6,446,092 B1 | 9/2002 | Sutter | |
| 7,213,065 B2 | 5/2007 | Watt | |
| 7,366,893 B2 * | 4/2008 | Tindal ..................... H04L 63/10 | |
| | | | 713/153 |
| 7,613,807 B2 | 11/2009 | Lahiri et al. | |
| 8,046,460 B1 | 10/2011 | Greenidge et al. | |
| 8,194,589 B2 * | 6/2012 | Wynn ..................... H04L 63/12 | |
| | | | 709/219 |
| 8,223,770 B2 | 7/2012 | Wray et al. | |
| 8,352,953 B2 | 1/2013 | Bozek et al. | |

(Continued)

*Primary Examiner* — Azizul Choudhury
(74) *Attorney, Agent, or Firm* — Polsinelli P.C.

(57) ABSTRACT

A method is provided in one example embodiment and includes creating a segment organization, which includes a configuration profile. The method also includes attaching the configuration profile to a server in the segment organization. The method further includes sending the attached configuration profile to a database in a physical network.

24 Claims, 5 Drawing Sheets

(56)                References Cited

U.S. PATENT DOCUMENTS

| | | | |
|---|---|---|---|
| 8,406,128 B1 | 3/2013 | Brar | |
| 8,832,820 B2 | 9/2014 | Barjatiya et al. | |
| 8,935,365 B1 | 1/2015 | Levin et al. | |
| 8,953,584 B1 | 2/2015 | Wang | |
| 9,397,856 B2 | 7/2016 | O'Connell et al. | |
| 9,432,254 B1 | 8/2016 | Naqvi | |
| 9,667,483 B2 | 5/2017 | Hillen et al. | |
| 9,710,762 B2 | 7/2017 | Nakil et al. | |
| 9,806,940 B1 | 10/2017 | Nielsen et al. | |
| 11,194,635 B2 | 12/2021 | Carlen et al. | |
| 2004/0123091 A1 | 6/2004 | Das | |
| 2006/0041885 A1 | 2/2006 | Broquere et al. | |
| 2009/0083385 A1* | 3/2009 | Heredia | G06F 15/16 709/206 |
| 2009/0187642 A1* | 7/2009 | McGrath | G06Q 30/02 709/220 |
| 2009/0213866 A1 | 8/2009 | Eicker | |
| 2009/0222906 A1* | 9/2009 | Brandstatter | H04L 67/02 726/15 |
| 2009/0234903 A1 | 9/2009 | Lomelli et al. | |
| 2010/0107162 A1 | 4/2010 | Edwards et al. | |
| 2010/0218248 A1 | 8/2010 | Nice et al. | |
| 2011/0047603 A1 | 2/2011 | Gordon et al. | |
| 2011/0085560 A1 | 4/2011 | Chawla et al. | |
| 2011/0103259 A1 | 5/2011 | Aybay et al. | |
| 2011/0252240 A1* | 10/2011 | Freedman | H04W 12/06 713/169 |
| 2011/0299413 A1 | 12/2011 | Chatwani et al. | |
| 2012/0147894 A1* | 6/2012 | Mulligan | H04L 41/40 718/1 |
| 2013/0034021 A1 | 2/2013 | Jaiswal et al. | |
| 2013/0061225 A1 | 3/2013 | Nakagawa | |
| 2013/0097294 A1* | 4/2013 | Deng | H04L 61/5014 709/221 |
| 2013/0117423 A1* | 5/2013 | Gupta | G06F 16/27 709/221 |
| 2013/0124908 A1* | 5/2013 | Gowin | G06F 11/0793 714/2 |
| 2013/0148511 A1 | 6/2013 | Banga | |
| 2013/0227564 A1 | 8/2013 | Asayama | |
| 2013/0326038 A1 | 12/2013 | Bodik | |
| 2014/0010110 A1 | 1/2014 | Zeng et al. | |
| 2014/0146823 A1 | 5/2014 | Angst | |
| 2014/0207918 A1 | 7/2014 | Kowalski et al. | |
| 2014/0258485 A1 | 9/2014 | Yang | |
| 2015/0110488 A1 | 4/2015 | Schlansker | |

* cited by examiner

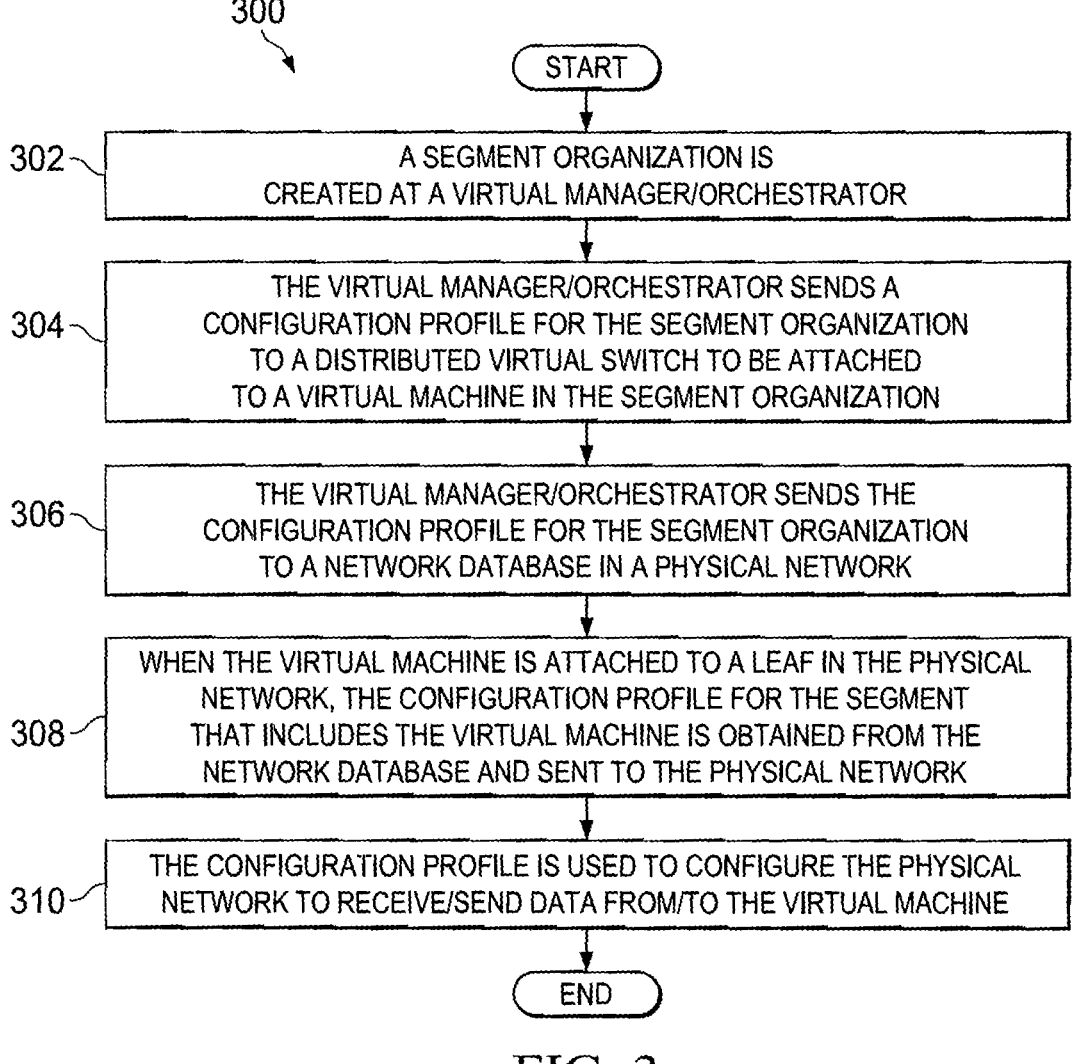

300

START

302 — A SEGMENT ORGANIZATION IS
CREATED AT A VIRTUAL MANAGER/ORCHESTRATOR

304 — THE VIRTUAL MANAGER/ORCHESTRATOR SENDS A
CONFIGURATION PROFILE FOR THE SEGMENT ORGANIZATION
TO A DISTRIBUTED VIRTUAL SWITCH TO BE ATTACHED
TO A VIRTUAL MACHINE IN THE SEGMENT ORGANIZATION

306 — THE VIRTUAL MANAGER/ORCHESTRATOR SENDS THE
CONFIGURATION PROFILE FOR THE SEGMENT ORGANIZATION
TO A NETWORK DATABASE IN A PHYSICAL NETWORK

308 — WHEN THE VIRTUAL MACHINE IS ATTACHED TO A LEAF IN THE PHYSICAL
NETWORK, THE CONFIGURATION PROFILE FOR THE SEGMENT
THAT INCLUDES THE VIRTUAL MACHINE IS OBTAINED FROM THE
NETWORK DATABASE AND SENT TO THE PHYSICAL NETWORK

310 — THE CONFIGURATION PROFILE IS USED TO CONFIGURE THE PHYSICAL
NETWORK TO RECEIVE/SEND DATA FROM/TO THE VIRTUAL MACHINE

END

FIG. 3

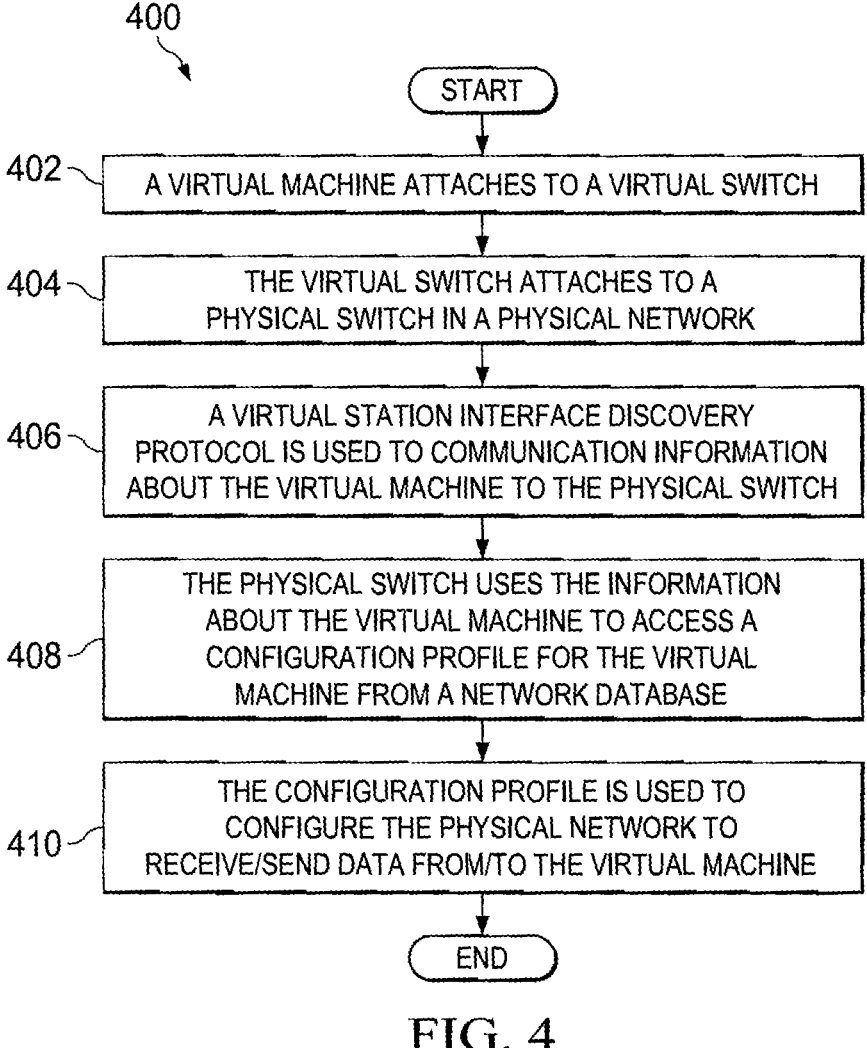

400

START

402 — A VIRTUAL MACHINE ATTACHES TO A VIRTUAL SWITCH

404 — THE VIRTUAL SWITCH ATTACHES TO A PHYSICAL SWITCH IN A PHYSICAL NETWORK

406 — A VIRTUAL STATION INTERFACE DISCOVERY PROTOCOL IS USED TO COMMUNICATION INFORMATION ABOUT THE VIRTUAL MACHINE TO THE PHYSICAL SWITCH

408 — THE PHYSICAL SWITCH USES THE INFORMATION ABOUT THE VIRTUAL MACHINE TO ACCESS A CONFIGURATION PROFILE FOR THE VIRTUAL MACHINE FROM A NETWORK DATABASE

410 — THE CONFIGURATION PROFILE IS USED TO CONFIGURE THE PHYSICAL NETWORK TO RECEIVE/SEND DATA FROM/TO THE VIRTUAL MACHINE

END

FIG. 4

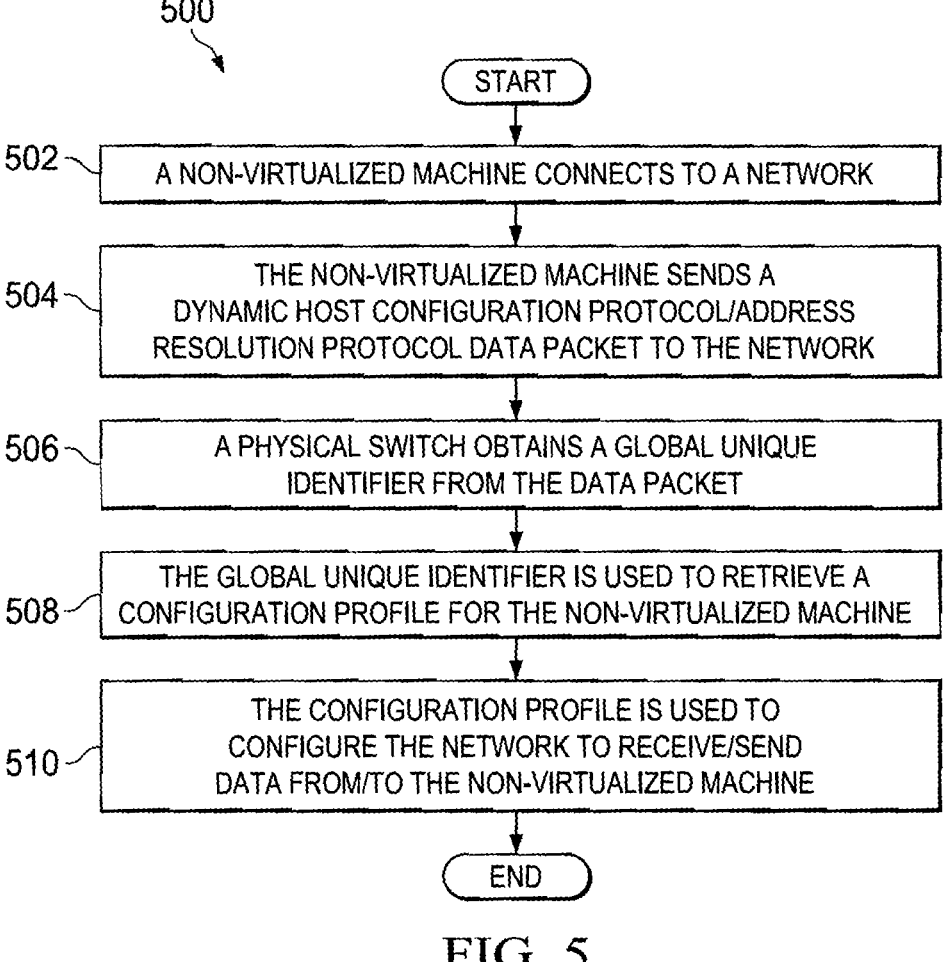

500

START

502 — A NON-VIRTUALIZED MACHINE CONNECTS TO A NETWORK

504 — THE NON-VIRTUALIZED MACHINE SENDS A DYNAMIC HOST CONFIGURATION PROTOCOL/ADDRESS RESOLUTION PROTOCOL DATA PACKET TO THE NETWORK

506 — A PHYSICAL SWITCH OBTAINS A GLOBAL UNIQUE IDENTIFIER FROM THE DATA PACKET

508 — THE GLOBAL UNIQUE IDENTIFIER IS USED TO RETRIEVE A CONFIGURATION PROFILE FOR THE NON-VIRTUALIZED MACHINE

510 — THE CONFIGURATION PROFILE IS USED TO CONFIGURE THE NETWORK TO RECEIVE/SEND DATA FROM/TO THE NON-VIRTUALIZED MACHINE

END

FIG. 5

PHYSICAL NETWORK ORCHESTRATION FOR DATA CENTERS

CROSS-REFERENCE TO RELATED APPLICATIONS

This application is a continuation of U.S. patent application Ser. No. 17/349,016, filed on Jun. 16, 2021, which in turn, is a continuation of U.S. patent application Ser. No. 16/696,729, filed Nov. 26, 2019, now granted U.S. Pat. No. 11,057,270, which in turn, is a continuation of U.S. patent application Ser. No. 15/842,411, filed Dec. 14, 2017, now granted U.S. Pat. No. 10,523,504, which in turn, is a continuation of U.S. patent application Ser. No. 13/921,083, filed Jun. 18, 2013, now granted U.S. Pat. No. 9,860,116, the contents of each of which is expressly incorporated by reference herein in their entirety.

TECHNICAL FIELD

This disclosure relates in general to the field of communications, and more particularly, to physical network orchestration for large scale date centers.

BACKGROUND

End users have more media and communications choices than ever before. A number of prominent technological trends are currently afoot (e.g., more computing devices, more online video services, more Internet traffic), and these trends are changing the media delivery landscape. Data centers serve a large fraction of the Internet content today, including web objects (text, graphics, Uniform Resource Locators (URLs) and scripts), downloadable objects (media files, software, documents), applications (e-commerce, portals), live streaming media, on demand streaming media, and social networks. In a datacenter, there are typically non-virtualized servers (e.g., bare-metal servers) as well as virtualized servers. A non-virtualized server is a server running an operating system (OS) directly on hardware as opposed to a virtualized server that runs the OS on software. In the datacenter, computing, storage, and networking capacity may be pooled into virtual datacenters. However, once a virtual network for the virtual datacenter has been provisioned, the physical network still needs to be independently provisioned so the whole network (including non-virtualized servers) is ready for the virtual servers to communicate with each other as well communicate with the non-virtualized servers.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified flowchart illustrating associated with the communication system;

FIG. 4 is a simplified flowchart illustrating associated with the communication system; and FIG. 5 is a simplified flowchart illustrating associated with the communication system.

DETAILED DESCRIPTION OF EXAMPLE EMBODIMENTS

Overview

A method is provided in one example embodiment and includes creating a segment organization, which includes a configuration profile. The segment organization can comprise any suitable arrangement, hierarchy, mapping, array, collection, assembly, layout, or intelligent grouping. Additionally, the configuration profile can include any suitable information that may be relevant to the activities discussed below. Additionally, the method includes attaching the configuration profile to a server in the segment organization. The method also includes sending the attached configuration profile to a database in a physical network.

In more particular embodiments, the configuration profile can include a segment identification for the server. The method can also include sending the attached configuration profile to the physical network when the server is attached to a physical switch in the physical network. In other examples, the server is a virtual machine and attaches to the physical switch through a virtual switch. In addition, when server is a virtual machine, then a virtual station interface discovery protocol may be used to send the configuration profile to the physical switch. The physical switch can use the segment identification to access the configuration profile for the server in the network database. In one example, the physical switch is a leaf in a CLOS network. Further, the server may be a virtual machine in a data center or a non-virtualized machine.

Example Embodiments

Figure 1:
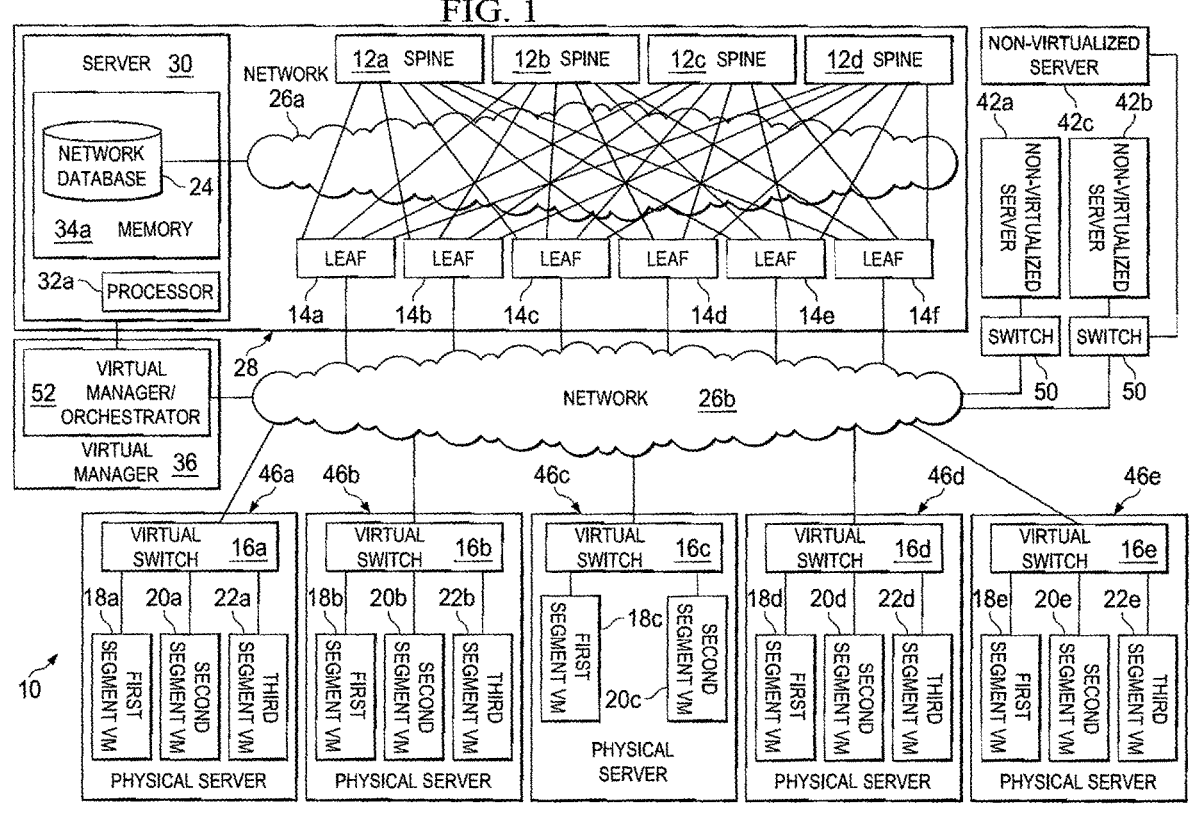
FIG. 1 is a simplified block diagram illustrating an example embodiment of a communication system in accordance with one embodiment of the present disclosure.

Turning to FIG. 1, FIG. 1 is a simplified block diagram of a communication system 10 configured for physical network orchestration for data centers. Communication system 10 may include physical network 28, virtual manager 36, a plurality of non-virtualized servers 42a-c, a plurality of physical servers 46a-e, and a plurality of switches 50. One or more of the plurality of switches 50 may be a physical switch. Virtual manager 36 can be configured to organize and support virtual machines (VMs) in physical servers 46a-e. Physical network 28 may include a plurality of spines 12a-d, a plurality of leafs 14a-f, a network 26a, and a server 30. Plurality of spines 12a-d and plurality of leafs 14a-f may communication through network 26a. Server 30 may include a processor 32a and a memory 34a. Memory 34a may include a network database 24. Server 30 may be a dynamic host configuration protocol (DHCP) server.

Physical server 46a may include a virtual switch 16a, a first segment VM 18a, a second segment VM 20a, and a third segment VM 22a. Physical server 46b may include a virtual switch 16b, a first segment VM 18b, a second segment VM 20b, and a third segment VM 22b. Physical server 46c may include a virtual switch 16c, a first segment VM 18c and a second segment VM 20c. Physical server 46d may include a virtual switch 16d, a first segment VM 18d, a second segment VM 20d, and a third segment VM 22d. Physical server 46e may include a virtual switch 16e, a first segment VM 18e, a second segment VM 20e, and a third segment VM 22e. (A third VM segment is not included in physical server 46c to illustrate that one or more of first segment VMs 18a-e, second segment VMs 20a-e, and/or third segment VMs 22a, b, d, and e may not be included in each physical server 46*a-e*.) Each physical server 46*a-e* can include one or more VMs. First segment VMs 18*a-e* can be VMs associated with a first portion or segment of a data network. Second segment VMs 20*a-e* can be VMs associated with a second portion or segment of the data network. Third segment VMs 22*a, b, d*, and *e* can be VMs associated with a third portion or segment of the data network. First segment VMs 18*a-e*, second segment VMs 20*a-e*, and/or third segment VMs 22*a, b, d*, and *e* may be connected to plurality of leafs 14*a-f* through network 26*b* or may have a direct connection to plurality of leafs 14*a-f*. Virtual manager can include a virtual manager/orchestrator 52 and may be a platform layer that allows for the creation, execution, support, etc. of VMs (e.g., first segment VMs 18*a-e*, second segment VMs 20*a-e*, and/or third segment VMs 22*a, b, d*, and *e*).

Virtual manager/orchestrator 52 can be configured to enable an administrator (or administrators) to deliver resources through virtual datacenters. By logically pooling computing, storage, and networking capacity into virtual datacenters, an administrator can manage resources between consumption and delivery of services. Instead of providing siloed physical infrastructures, virtual manager/orchestrator 52 can deliver isolated virtual datacenters that draw resources from a common physical infrastructure. By pooling the physical resources on a back end, hardware utilization and consolidation may increase. In addition, underlying infrastructure can be pooled into tiers and offered at distinct service levels and prices.

In general terms, communication system 10 may be configured to automate the provisioning of a physical network cluster (e.g., physical network 28) by utilizing existing information that is input in orchestration software as part of a cloud network creation. In this manner, both the physical network and the virtual network can be ready in a touchless manner once the VMs are deployed. Further, the same process can be used for non-virtualized servers or machines. Communication system 10 can be configured to work with almost any cloud orchestration software.

For purposes of illustrating certain example techniques of communication system 10, it is important to understand the communications that may be traversing the network. The following foundational information may be viewed as a basis from which the present disclosure may be properly explained.

A data center network is arguably one of the most challenging design problems for a network architect. The data center runs mission-critical applications for a business. Therefore, the network fabric that enables the communication between server nodes that run these applications are mission critical. With advances in distributed computing, data center bottleneck have been shifted to the network, thereby causing modern design methodologies to be employed in an attempt to overcome these challenges. One data center architecture for massive scale data center environments is a CLOS network that uses a CLOS-topology based spine-leaf architecture.

A CLOS network is a kind of multistage switching network and is often used when the physical circuit switching needs exceed the capacity of the largest feasible single crossbar switch. One advantage of CLOS networks is that the number of cross points required for efficient communication can be much fewer than if the entire switching system was implemented with one large crossbar switch. The separation of the end-station address space (underlay) from the topology address space (overlay) allows for lean spines and a natural scale-out model where scalability can be increased by adding more leafs (e.g., top of the rack switches (ToRs)) and (optionally) spines for better traffic spread.

Orchestration software allows for rapid creation of cloud networks and deployment of VMs in these networks by interfacing with appropriate virtual switches residing in a host cluster (e.g., Vmware® vSphere Distributed Switch (VDS), Cisco® Nexus 1000v, IBM® DVS 5000v, etc.). However, since the orchestration software does not have any visibility into the physical network, there is an inherent disconnect. While the orchestration software prepares the virtual network, the physical network still needs to be independently provisioned by a data center network administrator in terms of configuration of virtual local area networks (VLANs), access/trunk ports, switch virtual interfaces (SVIs), virtual routing and forwarding (VRF) tables, etc. Only after this is done is the network ready for the VMs to communicate with each other. What is needed is something to automate the provisioning of the physical network by utilizing the existing information that is input in the orchestration software as part of the cloud network creation. In this way, once the VMs are deployed, both the physical network and the virtual network can be ready in a touchless manner.

In accordance with one example implementation of the present disclosure, communication system 10 can resolve the aforementioned issues (and potentially others) associated with physical network orchestration for data centers. In one example implementation, in a cloud orchestration software, a segment (e.g., first segment) or organization virtual data cloud (VDC) is created. Networks are provisioned for that segment on a demand basis. Typically, for each network, a name is provided along with the segment information, default gateway, and static and DHCP pools for that segment. For each provisioned network, an unused segment is allocated from a network pool. This information is pulled (or pushed) from the orchestration software via standard extended messaging and presence protocol (XMPP), representational state transfer (REST), or other extensible markup language (XML) application program interfaces and populated into a physical network database (e.g., lightweight directory access protocol (LDAP), Oracle®, etc.) as part of the network creation. This includes population into a database (e.g., network database 24) such that an appropriate scope can be automatically created for subsequent provisioning (e.g., VM DHCP provisioning).

When VMs are deployed and come online, a hypervisor virtual switch (e.g., virtual switch 16*a*) communicates the information about the segmentID associated with the segment to a directly attached leaf (e.g., leaf 14*a*). In an example, communication system 10 employs IEEE 802.1Qbg (Clause 41) (Edge Virtual Bridging (EVB)/Discovery and Configuration Protocol (VDP)) protocol to communicate the information associated with the segment. On reception of the segmentID, the leaf (e.g., leaf 14*a*, which could be any suitable top-of-rack (ToR) switch) can query network database 24 to pull a requisite configuration for the segment and apply the information so that the leaf is ready for subsequently VM traffic from the segment. This includes, configuration of the segment VRF, an unused VLAN for the new network, mapping of a local VLAN to a segment associated with the segmentID, instantiation of the gateway SVI, DHCP relay configuration, etc. In this way, as VMs in the segments come up, they can use DHCP to obtain an unused IP address in the network and thus, are ready for communication. The VMs in the segment can be provisioned with static IP addresses as well. While the above example employs the segmentID as the key in a LDAP and/or DHCP database (e.g., network database 24), any generic network global unique identifier (GUID) may be used. In this way, provisioning of the physical network for virtualized workloads can be automated in a seamless touchless manner.

In one example, a media access control (MAC) address or some other GUID for a non-virtualized server may be associated with a configuration profile and stored in network database 24. Then, when the non-virtualized server connects to a network, the non-virtualized server sends a DHCP/address resolution protocol data packet to the network. A physical switch can obtain the MAC address from the data packet and use the MAC address to retrieve the configuration profile from the network database 24 for the non-virtualized server.

Note that in terms of advantages of certain embodiments of the present disclosure, no current solutions for virtualized data centers operate like the one proposed herein. Moreover, no existing solutions automate the provisioning of the physical network cluster, along with the virtual switches in a seamless touchless manner as controlled from a central orchestration piece. In accordance with certain example embodiments described herein, one proffered methodology can simplify the rapid provisioning of cloud deployments for large data center environments. Additionally, certain embodiments of the present disclosure require no changes in any orchestration software, as they could operate with any 3rd party software because the framework can utilize existing information to automate the physical network provisioning.

It should also be noted that providers of cloud orchestration software have visibility into the virtual switching side, but the physical network provisioning is not visible to them because the top-of-rack (ToR)/switches, etc. are from different vendors. By using a touchless orchestration solution, provisioning of the virtual and physical network (from a centralized orchestration software) can be provided to customers.

Certain embodiments of the present disclosure can offer one-click network provisioning. Additionally, the framework of the present disclosure can quickly configure any number of hypervisors, physical devices, etc. Moreover, the architecture of the present disclosure can provide for full reachability within and outside fabric. In certain cases, the solution can integrate with vCD, Openstack, or homegrown orchestration tools. Some capabilities of the present disclosure included device monitoring, topological display, reporting failures, etc. A data collection manager (which could be employed as a standalone device, piece of software, module, etc.) can configure statistics to be collected, exported at specified intervals, etc. Certain embodiments of the present disclosure can be integrated on a single management pane. Additionally, the network configuration on the fabric can move with the VM. Virtual services can be instantiated by the network services manager as desired for a given tenant.

Turning to the example infrastructure associated with present disclosure, first segment VMs 18*a-e*, second segment VMs 20*a-e*, and third segment VMs 22*a, b, d,* and *e* can be associated with virtual servers, virtual devices, customers, or end users wishing to receive data or content in communication system 10 via some network (e.g., network 26*a* and 26*b*). The term 'virtual machine' and 'VM' are used to signify a logically visible subdivision of an IP network. Typically, VMs that belong to a segment are addressed with a common, identical, most-significant bit-group in their IP address. This results in the logical division of an IP address into two fields, a network or routing prefix and a rest field or host identifier. The rest field is an identifier for a specific host or network interface.

The routing prefix can be expressed in classless inter-domain routing (CIDR) notation. CIDR is a method for allocating IP addresses and routing Internet Protocol packets. Generally, the routing prefix is written as the first address of a network, followed by a slash character (/), and ending with a bit-length of the prefix. For example, 192.168.1.0/24 is the prefix of an Internet Protocol Version 4 network starting at the given address, having 24 bits allocated for the network prefix, and the remaining 8 bits reserved for host addressing. The IPv6 address specification 2001:db8::/32 is a network with 296 addresses, having a 32-bit routing prefix. In IPv4 the routing prefix is also specified in the form of a segment (or subnet) mask, which is expressed in quad-dotted decimal representation like an address. For example, 255.255.255.0 is the network mask for the 192.168.1.0/24 prefix. Segments may be arranged logically in a hierarchical architecture, partitioning an organization's network address space into a tree-like routing structure.

Networks 26*a* and 26*b* represent a series of points or nodes of interconnected communication paths for receiving and transmitting packets of information that propagate through communication system 10. Networks 26*a* and 26*b* offers a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. A network can comprise any number of hardware or software elements coupled to (and in communication with) each other through a communications medium.

In terms of the infrastructure of the present disclosure, physical servers 46*a-e*, non-virtualized servers 42*a-c*, first segment VMs 18*a-e*, second segment Vms 20*a-e*, and third segment VMs 22*a, b, d,* and *e* can be associated with clients, customers, endpoints, or end users wishing to initiate a communication in communication system 10 via some network. The term 'server' is inclusive of devices used to serve the requests of clients and/or perform some computational task on behalf of clients within communication system 10. Virtual servers 46*a-e* non-virtualized servers 42*a-c*, first segment VMs 18*a-e*, second segment Vms 20*a-e*, and third segment VMs 22*a, b, d,* and *e* may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

Server 30, virtual manager/orchestrator 52, and a virtual manager 36 are network elements that can facilitate the physical network orchestration for data centers as discussed herein. As used herein in this Specification, the term 'network element' is meant to encompass any of the aforementioned VMs, as well as routers, switches, cable boxes, gateways, bridges, loadbalancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, server 30, virtual manager/orchestrator 52, and virtual manager 36 may include software to achieve (or to foster) activities associated with facilitating the physical network orchestration for data centers, as discussed herein. Additionally, each element can have an internal structure (e.g., a processor, a memory element, etc.) to facilitate some of the operations described herein. In other embodiments, facilitating the physical network orchestration for data centers may be executed externally to these elements, or included in some other network element to achieve the intended functionality. Alternatively, server 30, virtual manager/orchestrator 52, and/or virtual manager 36 may include software (or reciprocating software) that can coordinate with other network elements in order to achieve the support of facilitating the physical network orchestration for data centers as described herein. In still other embodiments, one or several devices may include any suitable algorithms, hardware, software, components, modules, interfaces, or objects that facilitate the operations thereof.

Figure 2:
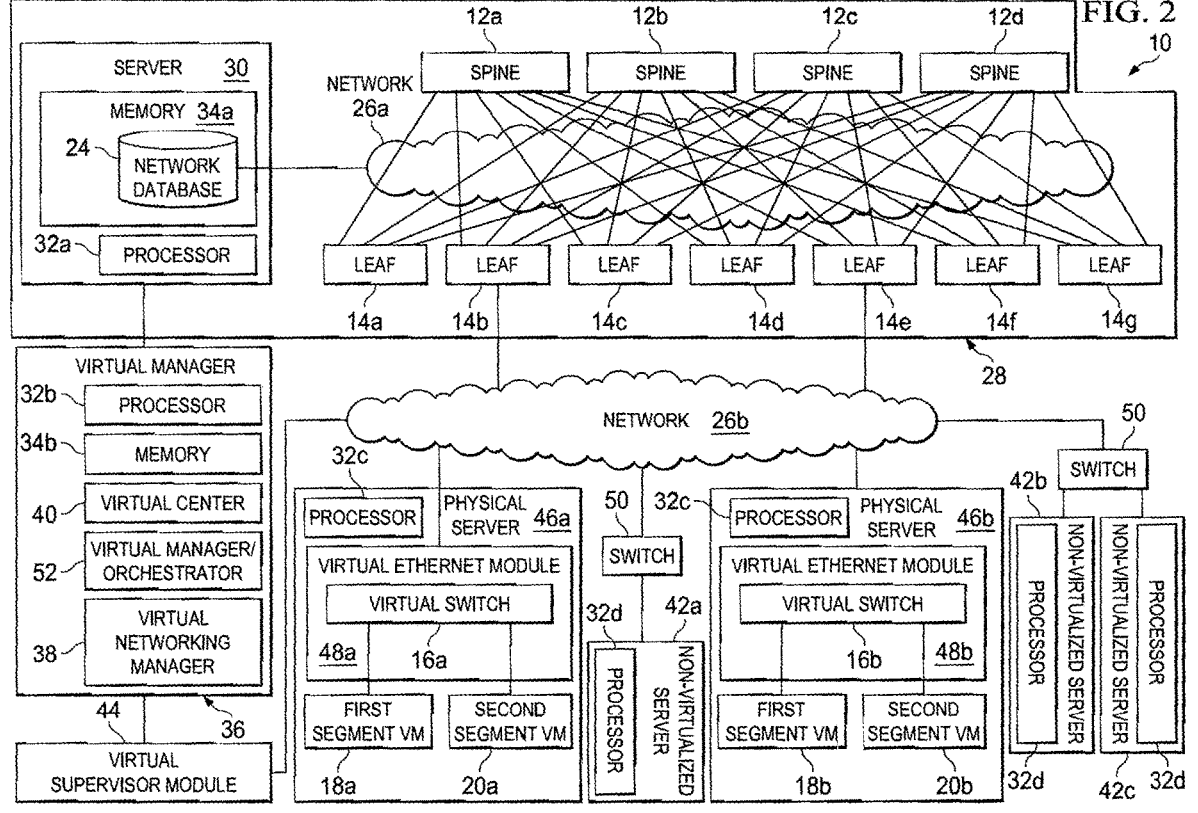
FIG. 2 is a simplified block diagram illustrating an example embodiment of a communication system in accordance with one embodiment of the present disclosure.

Turning to FIG. 2, FIG. 2 is a simplified block diagram of a communication system 10 configured for touchless physical network orchestration for data centers. Communication system 10 may include network 26b, physical network 28, virtual manager 36, non-virtualized servers 42a-c, a virtual supervisor module 44, physical servers 46a and b, and plurality of switches 50. Physical network 28 may include plurality of spines 12a-d, plurality of leafs 14a-g, network 26a, and server 30. Server 30 may include processor 32a and memory 34a. Memory 34a may include network database 24. Virtual manager 36 may include a processor 32b, a memory 34b, virtual networking manager 38, a virtual center 40, and virtual manager/orchestrator 52. Non-virtualized servers 42a-c may each include a processor 32d.

Virtual networking manager 38 can be configured to provide security for the VMs controlled by virtual manager 36. Virtual center 40 can be configured to provision and manage a plurality of servers and VMs For example, virtual networking manager 38 may be configured to monitor physical servers and VM availability and utilization, allocate processor and memory resources to VMs running on the same physical servers, establish minimum, maximum, and proportional resource shares for CPU, memory, disk and network bandwidth, modify allocations while VMs are running, move a VM from one physical server to another, create new VMs either from scratch, a template, copy an existing VM, etc.

Physical server 46a may include first segment VM 18a, second segment VM 20a, a processor 32c, and a virtual Ethernet module 48a. Virtual Ethernet module 48a may include virtual switch 16a. Physical server 46b may include first segment VM 18b, second segment VM 20b, processor 32c, and a virtual Ethernet module 48b. Virtual Ethernet module 48b may include virtual switch 16b. Virtual Ethernet modules 48a and 48b can be configured to facilitate communications with physical network 28 and virtual supervisor module 44. In addition virtual Ethernet modules 48a and 48b can be an open virtual switch (OVS or OvSwitch), virtual switch (vSwitch), distributed virtual switch, a hypervisor-based Windows® Server virtualization platform (e.g., hyper-V), or any other any regular/distributed virtual switch. Virtual supervisor module 44 can be configured to facilitate communications between non-virtualized servers 42a-c, physical servers 46a and b, virtual manager 36, and server

30. Virtual supervisor module 44 can be a controller (or multiple controllers) configured to manage a set of distributed virtual switches Turning to FIG. 3, FIG. 3 is a simplified flowchart 300 illustrating example activities associated with physical orchestration for data centers. At 302, a segment organization is created at a virtual manager/orchestrator. At 304, the virtual manager/orchestrator sends a configuration profile for the segment organization to a distributed virtual switch to be attached to a VM in the segment organization. At 306, the virtual manager/orchestrator sends the configuration profile for the segment organization to a network database in a physical network. At 308, when the VM is attached to a leaf in the physical network, the configuration profile for the segment organization that includes the VM is obtained from the network database and sent to the physical network. In an example, the VM is attached to a leaf through a control protocol or a data packet sent to the leaf. At 310, the configuration profile is used to configure the physical network to receive/send data from/to the virtual machine.

Turning to FIG. 4, FIG. 4 is a simplified flowchart 400 illustrating example activities associated with physical orchestration for data centers. At 402, a VM attaches to a virtual switch. At 404, the virtual switch attaches to a physical switch in a physical network. At 406, virtual station interface discovery protocol (VDP) (or some other protocol) is used to communicate information about the VM to the physical switch for the VM. For example, the information may include a segmentID or some other GUID. At 408, the physical switch uses the information about the VM to access a configuration profile for the VM from a network database. At 410, the configuration profile is used to configure the physical network to receive/send data from/to the virtual switch.

Turning to FIG. 5, FIG. 5 is a simplified flowchart 500 illustrating example activities associated with physical orchestration for data centers. At 502, a non-virtualized machine connects to a network. For example, the non-virtualized machine may be non-virtualized server 42a and the network may be physical network 26a. At 504, the non-virtualized machine sends a DHCP/address resolution protocol data packet to the network. At 506, a physical switch obtains a GUID from the data packet. For example, the GUID may be a MAC address. At 508, the GUID is used to retrieve a configuration profile for the non-virtualized machine. For example, the configuration profile may be retrieved from network database 24. The configuration profile can be stored in network database 24 when a segment organization is set up for the non-virtualized machine. At 510, the configuration profile is used to configure the network to receive/send data from/to the non-virtualized machine.

As identified previously, a network element can include software (e.g., virtual manager/orchestrator 52, and virtual manager 36, etc.) to achieve facilitating physical network orchestration for data centers, as outlined herein in this document. In certain example implementations, the functions for facilitating physical network orchestration for data centers as outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor [processors 32a shown in FIG. 1 and processor 32a-d shown in FIG. 2], or other similar machine, etc.).

In some of these instances, a memory element [memory 34a shown in FIG. 1 and memory 34a and *b* shown in FIG. 2] can store data used for the operations described herein. This includes the memory element being able to store instructions (e.g., software, code, etc.) that are executed to carry out the activities described in this Specification. The processor (e.g., one or more processors 32a-d) can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in supporting the physical network orchestration for data centers, as outlined herein. Additionally, each of these devices may include a processor that can execute software or an algorithm to perform the activities of facilitating physical network orchestration for data centers as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

It should also be noted that certain embodiments of the present disclosure, for example—aside from the communication of the segment ID to a top-of-rack (ToR) switch, can rely on a physical network DB; however, any suitable method/technique/protocol for generating and associating this element to a physical hypervisor/VM, etc. can be used. This could even include the use of any type of bare-metal machines, any suitable computer system, etc.

Additionally, the approach discussed above allows not just virtual machines, but also physical machines to join the same networks that one or multiple compute controllers can create. Traditionally, the networks created by a compute controller (e.g., vCD or Openstack) are used for just attaching VMs specifically also created in that same compute controller. In using the framework of the present disclosure, because networks created by the compute controller are exported into a compute controller agnostic network DB, and the entries are stored in a form that is typically independent of the type and location of machines that join those segments, and which is pulled from the leafs as machines attach to those networks, this environment allows VMs created by other compute controllers (or physical bare-metal machines (PMs) on the network) to attach on the same segments and, similarly, get assigned IP address out of the same shared DHCP pool.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and, further, can accommodate a large number of components, as well as more complicated/sophisticated arrangements and configurations. Accordingly, the examples provided should not limit the scope or inhibit the broad teachings of communication system 10, as potentially applied to a myriad of other architectures.

It is also important to note that the steps in the preceding FIGURES illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for configuring a network device, the method comprising:

at an orchestrator associated with an organization virtual network, associating a network device identifier with a network device configuration profile and storing the network device configuration profile in a storage module associated with the orchestrator, wherein the network device configuration profile comprises underlay network parameters and overlay network parameters, wherein the network device configuration profile further comprises network segment information comprising a segment identifier and one or more configuration parameters defining a virtual network segment for one or more hosts associated with the organization virtual network, the hosts of the virtual network segment isolated from hosts of the organization virtual network not associated with the virtual network segment;

at a first network device, connecting to an underlay network, wherein the first network device is not configured to connect to the organization virtual network;

communicating, over the underlay network, the network device identifier from the first network device to the orchestrator;

retrieving the network device configuration profile corresponding to the network device identifier from the storage module;

communicating the network device configuration profile from the orchestrator to the first network device;

configuring the first network device with the network segment information and the underlay network parameters and to transmit data over the organization virtual network to one or more endpoints using the overlay network parameters of the network device configuration profile; and in response to the first network device being configured with the network device configuration profile, transmitting data over the organization virtual network via the first network device, the organization virtual network configured as an overlay network over the underlay network and including the virtual network segment.

2. The method of claim 1, further comprising:

as part of communicating the network device identifier to the orchestrator, sending a first message to an intermediate network device;

extracting, by the intermediate network device, the network device identifier from the first message; and at the orchestrator, using the extracted network device identifier to retrieve the network device configuration profile.

3. The method of claim 1, wherein communicating the network device configuration profile from the orchestrator to the first network device comprises sending a push communication from the orchestrator to the first network device.

4. The method of claim 1, wherein configuring the first network device using the network device configuration profile further comprises configuring a VLAN.

5. The method of claim 1, wherein configuring the first network device using the network device configuration profile further comprises configuring a virtual routing and forwarding (VRF) table.

6. The method of claim 1, wherein configuring the first network device using the network device configuration profile further comprises configuring a switch virtual interface (SVI).

7. The method of claim 1, wherein configuring the first network device using the network device configuration profile further comprises associating a VLAN with a network segment.

8. The method of claim 1, wherein configuring the first network device using the network device configuration profile further comprises configuring a DHCP relay.

9. A system for configuration of a network device, the system comprising:

one or more nodes acting as an orchestrator associated with an organization virtual network, the one or more nodes including a processor, a memory, and a network interface;

a storage module associated with the orchestrator;

an underlay network with an existing configuration defined by the orchestrator, the existing configuration defining the organization virtual network as an overlay network over the underlay network, the underlay network communicably attached to the orchestrator; and a first network device, the first network device including a processor, a memory, a network interface, and the first network device is not configured to connect to the organization virtual network, wherein the orchestrator is configured to associate a network device identifier with a network device configuration profile and store the network device configuration profile in the storage module, wherein the network device configuration profile comprises underlay network parameters and overlay network parameters, wherein the network device configuration profile further comprises network segment information comprising a segment identifier and one or more configuration parameters defining a virtual network segment for one or more hosts associated with the organization virtual network, the hosts of the virtual network segment isolated from hosts of the organization virtual network not associated with the virtual network segment, wherein the first network device, upon connecting to a network, is configured to:

communicate, over the underlay network, the network device identifier from the first network device to the orchestrator, and wherein the orchestrator is further configured to, upon receiving the network device identifier:

retrieve the network device configuration profile corresponding to the network device identifier from the storage module, communicate the network device configuration profile to the first network device, and wherein the first network device modifies its network configuration with the network segment information and the underlay network parameters and to transmit data over the organization virtual network to one or more endpoints using the overlay network parameters; and in response to the first network device being modified with the network device configuration profile, transmitting data over the organization virtual network via the first network device, the organization virtual network configured as an overlay network over the underlay network and including the virtual network segment.

10. The system of claim 9, the system further comprising an intermediate network device, wherein the intermediate network device receives a message sent by the first network device as part of its communication to the orchestrator, and wherein the intermediate network device is configured to extract the network device identifier from the message, and wherein the orchestrator uses the extracted network device identifier to retrieve the network device configuration profile.

11. The system of claim 9, wherein the communication of the network device configuration profile from the orchestrator to the first network device comprises a push communication from the orchestrator to the first network device.

12. The system of claim 9, wherein modifying the first network device's network configuration using the network device configuration profile comprises configuring a VLAN.

13. The system of claim 9, wherein modifying the first network device's network configuration using the network device configuration profile comprises configuring a virtual routing and forwarding (VRF) table.

14. The system of claim 9, wherein modifying the first network device's network configuration using the network device configuration profile comprises configuring a switch virtual interface (SVI).

15. The system of claim 9, wherein modifying the first network device's network configuration using the network device configuration profile comprises associating a VLAN with a network segment.

16. The system of claim 9, wherein modifying the first network device's network configuration using the network device configuration profile comprises configuring a DHCP relay.

17. One or more non-transitory computer-readable media, including instructions which when executed at one or more network devices by one or more processors, cause the devices to:

at one or more nodes acting as a network orchestrator a storage module associated with an orchestrator, the orchestrator associated with an organization virtual network;

an underlay network with an existing configuration defined by the orchestrator, the existing configuration defining the organization virtual network as an overlay network over the underlay network, the underlay network, communicably attached to the orchestrator; and a first network device, the first network device including a processor, a memory, and a network interface;

at one or more nodes acting as an orchestrator, associate a network device identifier with a network device configuration profile and store the network device configuration profile in a storage module, wherein the network device configuration profile comprises underlay network parameters and overlay network parameters, wherein the network device configuration profile further comprises network segment information comprising a segment identifier and one or more configuration parameters defining a virtual network segment for one or more hosts associated with the organization virtual network, the hosts of the virtual network segment isolated from hosts of the organization virtual network not associated with the virtual network segment;

at a first network device associated with the network device identifier, upon connecting to a network, communicate, over the underlay network, the network device identifier from the first network device to the orchestrator, wherein the first network device is not configured to connect to the organization virtual network;

and at the orchestrator, upon receiving the network device identifier, retrieve the network device configuration profile corresponding to the network device identifier from the storage module;

and communicate the network device configuration profile to the first network device;

at the first network device, modify the device configuration with the network segment information and the underlay network parameters and to transmit data over the organization virtual network to one or more endpoints using the overlay network parameters; and in response to the first network device being modified with the network device configuration profile, transmitting data over the organization virtual network via the first network device, the organization virtual network configured as an overlay network over the underlay network and including the virtual network segment.

18. The one or more non-transitory computer-readable media of claim 17, further comprising instructions, which cause the one or more devices to, as part of communicating the network device identifier from the first network device to the orchestrator, send a first message to an intermediate network device;

at the intermediate network device, extract the network device identifier from the first message; and at the orchestrator, use the extracted network device identifier to retrieve the network configuration profile.

19. The one or more non-transitory computer-readable media of claim 17, wherein the instructions causing the orchestrator to communicate the network device configuration to the first network device include instructions to send a push communication to the first network device.

20. The one or more non-transitory computer-readable media of claim 17, wherein modifying the device configuration using the network device configuration profile comprises configuring a VLAN.

21. The one or more non-transitory computer-readable media of claim 17, wherein modifying the device configuration using the network device configuration profile comprises configuring a virtual routing and forwarding (VRF) table.

22. The one or more non-transitory computer-readable media of claim 17, wherein modifying the device configuration using the network device configuration profile comprises configuring a switch virtual interface (SVI).

23. The one or more non-transitory computer-readable media of claim 17, wherein modifying the device configuration using the network device configuration profile comprises associating a VLAN with a network segment.

24. The one or more non-transitory computer-readable media of claim 17, wherein modifying the device configuration using the network device configuration profile comprises configuring a DHCP relay.

* * * * *